(12) United States Patent
Lottes et al.

(10) Patent No.: US 11,231,284 B2
(45) Date of Patent: Jan. 25, 2022

(54) METHOD AND DATA PROCESSING SYSTEM FOR GENERATING MAP DATA OF A DIGITAL MAP

(71) Applicant: Bayerische Motoren Werke Aktiengesellschaft, Munich (DE)

(72) Inventors: Alexander Lottes, Munich (DE); Werner Richter, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 369 days.

(21) Appl. No.: 16/354,026

(22) Filed: Mar. 14, 2019

(65) Prior Publication Data

US 2019/0212154 A1    Jul. 11, 2019

Related U.S. Application Data

(63) Continuation of application No. PCT/EP2017/072470, filed on Sep. 7, 2017.

(30) Foreign Application Priority Data

Sep. 15, 2016    (DE) .................... 10 2016 217 654.4

(51) Int. Cl.
 *G06F 16/29*    (2019.01)
 *G01C 21/32*    (2006.01)
 (Continued)

(52) U.S. Cl.
 CPC ......... *G01C 21/32* (2013.01); *G06F 16/2379* (2019.01); *G06F 16/29* (2019.01); *G01C 21/34* (2013.01)

(58) Field of Classification Search
 CPC ...... G01C 21/32; G01C 21/34; G01C 21/005; G01C 21/367; G01C 21/3815;
 (Continued)

(56) References Cited

U.S. PATENT DOCUMENTS

| 5,948,042 A | 9/1999 | Heimann et al. |
| 9,098,496 B2 | 8/2015 | Matsunaga et al. |

(Continued)

FOREIGN PATENT DOCUMENTS

| DE | 195 25 291 C1 | 12/1996 |
| DE | 10 2008 052 941 A1 | 7/2009 |

(Continued)

OTHER PUBLICATIONS

PCT/EP2017/072470, International Search Report dated Jan. 26, 2018 (Two (2) pages).

(Continued)

*Primary Examiner* — Masud Ahmed
(74) *Attorney, Agent, or Firm* — Crowell & Moring LLP

(57) ABSTRACT

In a method for generating map data of a digital map from raw data of the digital map with improved flexibility, an object-specific correction data set is used for generating the map data. The object-specific correction data set comprises precisely one value of a derived attribute for the map object, wherein the value of the derived attribute contained in the correction data set is allocated to the map object of the map data.

8 Claims, 1 Drawing Sheet

(51) Int. Cl.
*G06F 16/23* (2019.01)
*G01C 21/34* (2006.01)

(58) Field of Classification Search
CPC ..... G01C 21/26; G06F 16/2379; G06F 16/29; G06F 16/28; G06F 16/00
See application file for complete search history.

(56) References Cited

U.S. PATENT DOCUMENTS

| | | | |
|---|---|---|---|
| 2009/0138497 A1* | 5/2009 | Zavoli | G01C 21/32 |
| 2014/0358414 A1 | 12/2014 | Ibrahim et al. | |
| 2015/0314663 A1* | 11/2015 | Rhode | B60G 17/0165 |
| | | | 701/37 |
| 2016/0229252 A1* | 8/2016 | Lu | B60G 17/02 |
| 2019/0316915 A1* | 10/2019 | Koda | G01C 21/32 |

FOREIGN PATENT DOCUMENTS

| | | |
|---|---|---|
| DE | 10 2010 028 090 A1 | 12/2011 |
| DE | 10 2012 004 625 A1 | 9/2013 |
| EP | 1 365 212 A1 | 11/2003 |
| EP | 2 410 294 A1 | 1/2012 |

OTHER PUBLICATIONS

German Search Report issued in German counterpart application No. 10 2016 217 654.4 dated Apr. 3, 2017, with Statement of Relevancy (Ten (10) pages).

* cited by examiner

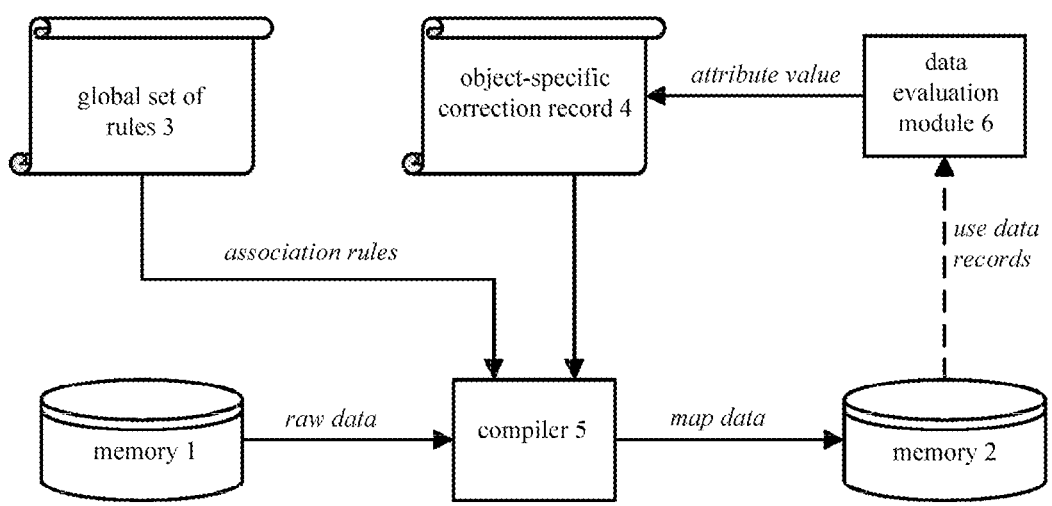

METHOD AND DATA PROCESSING SYSTEM FOR GENERATING MAP DATA OF A DIGITAL MAP

CROSS REFERENCE TO RELATED APPLICATIONS

This application is a continuation of PCT International Application No. PCT/EP2017/072470, filed Sep. 7, 2017, which claims priority under 35 U.S.C. § 119 from German Patent Application No. 10 2016 217 654.4, filed Sep. 15, 2016, the entire disclosures of which are herein expressly incorporated by reference.

BACKGROUND AND SUMMARY OF THE INVENTION

The present invention relates to a method for generating map data of a digital map from raw data of the digital map and to a data processing installation therefor.

Ever-growing importance is attached to digital maps in a modern society. Coverage, accuracy and up-to-dateness of digital maps are continually improved. Users can use digital maps no longer just on stationary computers (e.g. personal computers, PCs) but also by means of portable mobile devices (e.g. smartphones) and in navigation systems of modern motor vehicles. Digital maps today are used no longer exclusively for route planning but also for numerous other services, which are known by the collective term "location-based services".

The technical configuration of a digital map and the type and extent of the map objects contained in the map can vary greatly depending on the intended use and/or the provider of the map. It has thus been found to be useful to generate map data of a digital map by using raw data of the digital map and to process and/or add to said raw data such that a digital map having the desired properties is obtained. The process of generating map data of a digital map from raw data of the digital map is also referred to as compiling.

By way of example, map objects (e.g. points of interest, POIs) can be added during compiling. Further, existing map objects can be assigned attributes. As such, for example a road section (in this context also referred to by the term "link") can be assigned attributes such as e.g. "road type". Owing to the large number of map objects, global association rules are used for this purpose based on the prior art. By way of example, links that are outside of a town in Germany and whose average speed is between 90 km/h and 110 km/h could be assigned the road type "country road" as an attribute. This approach allows the digital map to be enhanced with a large number of attributes in automated fashion. A disadvantage, however, is the lack of flexibility of this method.

Against the background of the prior art, an object that arises is that of making the generation of map data of a digital map from raw data of the digital map more flexible.

The object is achieved in a method and a data processing installation by means of the features of the independent claims. Advantageous developments of the invention are covered by the dependent claims.

The method according to the invention is used for generating map data of a digital map from raw data of the digital map. The raw data comprise at least one map object and one value each of at least one attribute, which value is associated with the at least one map object. In other words, the raw data contain map objects such as road sections ("links") and connecting nodes ("nodes").

For one (or several or all) of these map objects, the raw data can comprise values of an attribute. In this context, an attribute can also be described as a property of a map object. An attribute of a road section can be the maximum permissible speed thereon for example. For one particular road section, the raw data can comprise for example the value "80 km/h" of the "maximum speed" attribute. Naturally, the raw data can comprise, for a map object, one value each for more than one attribute. Conversely, the raw data can contain map objects for which no value of an attribute is stored.

The map data of the digital map comprise the at least one map object and a value of a derived attribute, which value is associated with the map object. In this case, the map data are generated by applying a global set of rules that comprises at least one association rule that assigns precisely one value of the derived attribute to a value of an attribute. In other words, during the generation of the map data according to the invention the map objects are ascribed additional attributes (that is to say properties) whose values result from the global set of rules.

An association rule within the context of the invention is a mathematical function that can also be configured as an association table. An association rule thus assigns precisely one value of a derived attribute to at least one value of at least one attribute. If the global set of rules does not comprise an association rule for a particular value of an attribute or for a particular combination of values of multiple attributes, no value of the derived attribute is assigned to the map object of the map data.

According to the invention, the map data are generated by further applying an object-specific correction data record. The latter comprise, for at least one map object, precisely one value each of the at least one derived attribute. The at least one map object of the map data is assigned the value of the at least one derived attribute that is contained in the correction data record.

In other words, the invention thus provides for the map data to be initially compiled in the manner known per se in the prior art, wherein the global set of rules is used to allocate derived attributes. As the method according to the invention proceeds further, the correction data record is then used to correct and/or reallocate values of the derived attributes. In contrast to the allocation of derived attributes by means of the global set of rules, derived attributes are allocated not on the basis of the generic (that is to say generally valid) association rules, however, but rather in an object-specific manner by means of the individual correction data record.

The invention therefore allows exceptions and special cases not covered by the global set of rules to be handled in a flexible manner. This is advantageous in two cases in particular. First, it can happen that the value of the derived attribute that is assigned by means of the global set of rules is incorrect or imprecise. This can be the case if the relevant map object has "atypical" properties not mapped by the global set of rules. The object-specific correction data record can be used to correct an incorrect or imprecise value of this kind, i.e. to replace it with the correct value in each instance. Secondly, it can happen that the global set of rules is not used to assign a value of a particular derived attribute, even though this would have been desirable. The object-specific correction data record can then be used to assign the value of the derived attribute to the map object. Conversely, it can also happen that a value of a particular derived attribute is assigned even though this should not have happened. The object-specific correction data record can then be used to remove the assigned value of the derived attribute from the map object again.

In an advantageous configuration, the map data comprise a descriptor associated with the map object, wherein the correction data record comprises, for the map object, the descriptor thereof and the value of the derived attribute. In this way, the correction data record can be structured particularly systematically and efficiently. By way of example, the correction data record can consist of a table whose rows each contain the descriptor of the map object, the derived attribute and the value thereof. The descriptors are advantageously allocated uniquely. Any systematics applied for the allocation of the descriptors can be used for the correction data record. For example if the association of map objects with a particular geographical area is reflected in a particular feature of the respective descriptors (e.g. in a particular numerical range of the descriptors) and if all the map objects in this geographical area are meant to be assigned particular values of the derived attribute by means of the correction data record, then the correction data record can also contain the applicable feature of the respective descriptors (e.g. the numerical range of the descriptors) rather than the explicit naming of all the map objects.

In a particularly advantageous development of the method, additionally a use data record is received from a user of the map data, in particular from a motor vehicle. The use data record comprises a descriptor of a map object and at least one movement parameter describing a movement of the user relative to the map object. The received use data record is taken as a basis for creating or updating the correction data record. In other words, there is thus provision for information obtained during use of the digital map, in particular in a motor vehicle, to be used for creating or updating the correction data record. In this way, a large amount of information can be obtained and rendered usable. Since a crowd of users contributes to obtaining information, such a method is also described by the term "crowd sourcing". It is particularly advantageous if the use data records are processed not manually but rather by means of automated algorithms. In this case, a person skilled in the art can resort to a wide range of inherently known methods of machine learning and pattern recognition.

The invention is further formed by a data processing installation for generating map data of a digital map from raw data of the digital map. The data processing installation according to the invention is configured for performing the method according to the invention.

In an advantageous configuration, the data processing installation comprises a data evaluation module configured for performing certain additional steps. For this purpose, the data evaluation module can have a connection to the Internet or to an Internet server, which means that the use data records can be transmitted from the users to the data evaluation module over the Internet.

Further embodiments of the invention are explained below on the basis of an exemplary depiction, in which Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows an embodiment of a data processing installation using a schematic depiction.

DETAILED DESCRIPTION OF THE DRAWING

It is pointed out that the depicted FIGURE and the associated description are merely an exemplary embodiment of the invention. In particular, depictions of combinations of features in the FIGURE and/or the description of the FIGURE are not intended to be interpreted to mean that the invention necessarily requires implementation of all the cited features. Other embodiments of the invention can contain fewer, more and/or different features. The scope of protection and the disclosure of the invention result from the accompanying patent claims and the complete description. It is also pointed out that the depiction is a basic depiction of an embodiment of the invention. The arrangement of the individual depicted elements relative to one another is chosen only by way of example and can be chosen differently for other embodiments of the invention.

FIG. 1 shows a data processing installation 5, which can also be referred to as a compiler 5 or map compiler 5. A data memory 1 stores raw data 1 of the digital map. A further data memory 2 is used to store the map data 2 of the digital map. The data memories 1, 2 can each be part of the data processing installation 5. They can alternatively be configured as separate units or as parts of other data processing units, which are not depicted in FIG. 1. The data memories 1, 2 can be different memory areas of the same physical memory (e.g. of a hard disk of the data processing installation 5). To generate the map data 2, the map compiler 5 accesses a global set of rules 3 and a correction data record 4.

The example below is intended to clarify the sequence of events in the method according to the invention.

Table I below depicts exemplary raw data 1:

TABLE I

| Raw data 1 | | | |
| --- | --- | --- | --- |
| Link ID | CA | MD | SL |
| R0815 | 1 | 1 | 130 |
| R0816 | 1 | 0 | 80 |
| R0817 | 0 | 1 | 80 |
| R0818 | 0 | 0 | 100 |

The raw data 1 comprise four map objects that have the descriptors indicated in the first column (with the heading "Link ID"). At this juncture, it should be pointed out that the descriptor of a map object can be changed or reallocated during compilation of the digital map. This will become clear below on the basis of the exemplary embodiment. The four map objects are "links", that is to say sections of roads.

The raw data 1 further comprise the attributes CA, MD and SL indicated in the further columns. Each of these attributes has an associated value for each map object.

The attribute CA (for "control access") relates to the property of whether access to this link is restricted, that is to say for example is permissible only for motor vehicles but not for cyclists or pedestrians. By way of example, an object having the value CA=0 can have no access restriction, whereas there is an access restriction for CA=1.

The attribute MD (for "multiply digitized") relates to the property of whether the link has two directions of travel. By way of example, the directions of travel can exist as separate links (having separate descriptors) in the case of directions of travel that are physically separate (e.g. as a result of a median strip and/or a crash barrier). In this case, MD=1, for example. By contrast, a link can comprise two directions of travel. In that case MD=0.

The attribute SL (for "speed limit") relates to the maximum permissible speed. For example, SL=80 can mean that the maximum permissible speed is 80 km/h.

Table II shows an example of a global set of rules 3.

TABLE II

| Global set of rules 3 | | | |
| --- | --- | --- | --- |
| CA | MD | SL | AA1 |
| 1 | 1 | 130 | 2 |
| 1 | 0 | 80 | 1 |
| 0 | 1 | 80 | 1 |
| 0 | 0 | 100 | 0 |

The set of rules 3 contains four association rules in total that each correspond to a row of table II. The association rules assign a value of the derived attribute AA1 on the basis of the values of the attributes CA, MD and SL. It should be noted that the simplified depiction in table II was chosen from didactic points of view. Global sets of rules that are actually used can be much more extensive. Moreover, the association rules can be more complex. By way of example, the association rules can relate not only to exact values (e.g. SL=80) but also to ranges of values (e.g. 80<SL<120).

The derived attribute AA1 can relate to the road type, for example. As such, AA1=2 can correspond to the road type "freeway". According to the association rule stored in the first row of table II, this value is allocated if a link has restricted access (CA=1) and is separated according to the direction of travel (MD=1) and also has a maximum speed of 130 km/h. A value AA1=1 could correspond to a road type "road similar to a freeway". A value AA1=0 could correspond to a road type "country road".

The global set of rules 2 is used to assign the values of the derived attribute AA1 to the map objects during compilation, that is to say generation of the map data 2 from the raw data 1.

Table III shows a correction data record 4. The correction data record 4 is used to assign values of the derived attribute AA1 to individual map objects that are denoted on the basis of their descriptor (Link ID) set out in the left-hand column. It should again be pointed out that during compilation of the digital map it is possible for new descriptors to be allocated for the map objects. The Link IDs in Table III are thus not in agreement with the Link IDs in Table I.

TABLE III

| Correction data record 4 | |
| --- | --- |
| Link ID | AA1 |
| 4711 | 1 |
| 4712 | 1 |
| 4713 | 0 |

As is evident from Table III, the value AA1=1 of the derived attribute AA1 is assigned to the map object having the descriptor "4711". It is unimportant in this case which value of the derived attribute AA1 has actually been assigned to the object "4711" on the basis of the global set of rules 3. By way of example, the link "4711" can be a road similar to a freeway (AA1=1) but having atypical properties, meaning that it would be incorrectly classified as a freeway (AA1=2) on application of the global set of rules 3.

Further, the map object having the descriptor "4712" is assigned the value AA1=1 of the derived attribute AA1, and the map object having the descriptor "4713" is assigned the value AA1=0.

Examples of derived attributes that can be assigned by means of the method according to the invention are the road type and/or the presence of a physical separation for the directions of travel (e.g. median strip and/or crash barrier). A further example relates to the likelihood of road users in the surroundings being reliable. This derived attribute can be important for driver assistance systems of motor vehicles that allow semiautomated, highly automated or fully automated driving of the motor vehicle. Other motor vehicles can be classified as reliable road users, for example, whereas cyclists and pedestrians are classified as unreliable road users. Further levels are also conceivable. As such, children could be classified as particularly unreliable, for example. An applicable derived attribute AA2 conveying the likelihood of road users in the surroundings being reliable could be AA2=100% on a freeway and AA2=0% close to a kindergarten or a school, for example.

The example of this derived attribute AA2 will be used below to explain the way in which the data evaluation module 6 works. In FIG. 1, the connection from the map data 2 to the data evaluation module 6 is depicted in dashes. This depiction is intended to clarify that for example data from the data memory 2 cannot be transmitted to the data evaluation module 6. Rather, use data records from users of the map data 2, in particular from motor vehicles, are transmitted to the data evaluation module 6. The use data records comprise a descriptor of a map object and at least one movement parameter describing a movement of the user relative to the map object.

It should be assumed by way of example that a particular link having the Link ID "6210" has the attribute AA1=0, that is to say that it is a country road. For this link, a value AA2=80% is allocated on the basis of the global set of rules 3. There is thus a very high likelihood of 80% that the road users in this road section are reliable.

The Link 6210 further has the attribute SL=100, that is to say that a maximum speed of 100 km/h applies. Numerous vehicles passing through the road section 6210 use a mobile data connection to report their driving data to a central server (what is known as a "backend"), where the data are processed. The central server can be the data evaluation module 6. Similarly, the use data records can be transmitted from the server to the data evaluation module 6 in unprocessed or processed form.

One of the movement parameters relates to the actual instantaneous speed. When evaluating the numerous use data records by means of a machine learning method suitable for detecting recurring patterns in the data, the data evaluation module 6 makes the following discovery. The instantaneous speed of the vehicles traveling on the Link 6210 is approximately 100 km/h for a continuous period of 28 minutes in each case. For a subsequent period of approximately 2 minutes in each case, the instantaneous speed is then only 20 km/h, on average, however. At the same time, the statistical variation (or variance) in the instantaneous speed increases. The end of the approximately two-minute period is followed by the described period of approximately 28 minutes again. From this observation, it can be concluded that the Link 6210 has a bus stop that is called at half-hourly.

On the basis of the use data records evaluated in this manner, the correction data record 4 can now be created as follows. Since there is a substantially greater likelihood of pedestrians being present at a bus stop than on an open country road, the value AA2=20% is assigned for the Link 6210 in the correction data record 4. Further, the correction data record 4 could be used to assign the value 1 to an attribute denoting the presence of a bus stop.

LIST OF REFERENCE SIGNS

1 Raw data of the digital map
2 Map data
3 Global set of rules
4 Correction data record
5 Data processing installation (compiler)
6 Data evaluation module The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating of a digital map from raw data, the raw data comprising a map object and a value of a raw data attribute associated with the map object and characterizing an attribute of the map object, the digital map comprising map data that includes the map object and a value of a derived attribute associated with the map object and characterizing a different attribute of the map object, the map object comprising one of: a link and a node of the digital map, the method comprising the acts of:
generating the map data by applying a global set of rules, including at least one association rule that assigns a first value of the derived attribute;
applying an object-specific correction data record, that includes, for the map object, a second value of the derived attribute; and
assigning the second value of the derived attribute from the correction data record to the map object of the map data, so as to generate the digital map,
wherein the raw data and map data are each computer data objects stored in at least one memory accessible by a map compiler.

2. The method as of claim 1,
wherein the map data includes a descriptor associated with the map object, and
wherein the correction data record includes the descriptor.

3. The method of claim 1, further comprising:
receiving a use data record from a user of the map data in a motor vehicle, wherein the use data record comprises a descriptor of the map object and at least one movement parameter describing a movement of the user relative to the map object; and
creating or updating the correction data record based on the received use data record.

4. The method of claim 2, further comprising:
receiving a use data record from a user of the map data in a motor vehicle, wherein the use data record comprises a descriptor of the map object and at least one movement parameter describing a movement of the user relative to the map object; and
creating or updating the correction data record based on the received use data record.

5. A system for generating a digital map from raw data, wherein the digital map comprises map data, the system comprising:
at least one memory that stores:
raw data that includes a map object and a value of a raw data attribute associated with the map object and characterizing an attribute of the map object, and
map data that includes the map object and a value of a derived attribute associated with the map object and characterizing a different attribute of the map object,
wherein the map object comprises one of: a link and a node of the digital map; and
a data processing installation configured to:
generate the map data by applying a global set of rules, including at least one association rule that assigns a first value of the derived attribute to the raw data,
apply an object-specific correction data record that includes, for the map object, a second value of the derived attribute, and
assign the second value of the derived attribute from the correction data record to the map object of the map data, so as to generate the digital map.

6. The of claim 5,
wherein the map data includes a descriptor associated with the map object, and
wherein the correction data record includes the descriptor.

7. The of claim 5, further comprising:
a data evaluation module configured to:
receive a use data record from a user of the map data in a motor vehicle, wherein the use data record comprises a descriptor of the map object and at least one movement parameter describing a movement of the user relative to the map object, and
create or update the correction data record based on the received use data record.

8. The of claim 6, further comprising:
a data evaluation module configured to:
receive a use data record from a user of the map data in a motor vehicle, wherein the use data record comprises a descriptor of the map object and at least one movement parameter describing a movement of the user relative to the map object, and
create or update the correction data record based on the received use data record.

* * * * *